S. BOORN.
Rubber Articles.
No. 16,709.
Patented Mar. 3, 1857.
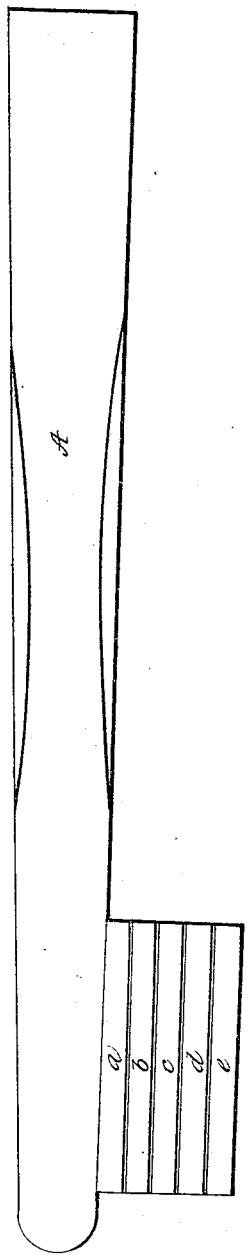
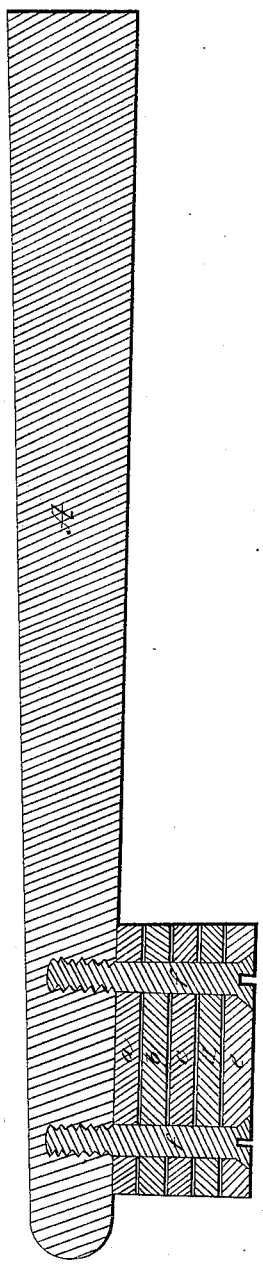

UNITED STATES PATENT OFFICE.

SAMUEL BOORN, OF LOWELL, MASSACHUSETTS.

COMPOSITION FOR SHUTTLE-DRIVERS.

Specification of Letters Patent No. 16,709, dated March 3, 1857.

*To all whom it may concern:*

Be it known that I, SAMUEL BOORN, of Lowell, in the county of Middlesex and State of Massachusetts, have invented a new and useful Composition to be Used in the Manufacture of Strikers of Shuttle-Drivers; and I do hereby declare that the same is fully described and a striker for a shuttle-driver represented in the following specification and the accompanying drawings, of which—

Figure 1, denotes a side view; Fig. 2, a front view, and Fig. 3, a longitudinal section of one of the said strikers as applied to the pick staff of a loom.

The strikers as ordinarily made of raw hide soon become worn out, and require frequent renewal.

My object has been to make a striker which would be much more durable and better answer the purpose of driving or impelling a shuttle, and I have so completely succeeded that one of my improved strikers will last six months or more under the ordinary daily use of a loom.

In constructing this striker I make it of several pieces or layers of leather as seen at *a*, *b*, *c*, *d*, *e*, one being laid on the other. Each of these layers, except the outer one, viz., *e*, is prepared as follows: I take common belt leather, or that of the skirts or soft and spongy portions of a tanned hide (such portions generally being of little or no value) and after reducing them to, or nearly to, the form required, I introduce them into a composition made of the following materials in or about in the following proportions, viz., two pounds of gum shellac, one pound of rosin, one quarter of a pound of isinglass, two ounces of gum arabic. These together are to be dissolved in alcohol or in linseed oil and spirits of turpentine in quantity sufficient to give the composition about the consistency of common varnish. The isinglass gives strength and firmness to the mixture, while the gum arabic enables it to take a polish, when on the leather, and thus prevent fraying and wear of the striker by the nose of the shuttle.

After the leather has been placed in a proper quantity of the composition, heat is to be applied to the latter so as to elevate its temperature as high as possible without crisping or burning the leather. Layers sufficient to make one striker are next to be taken out of the heated composition and laid together flatwise, one on the other, a layer of leather, *e*, which not having been immersed in the composition being applied to or laid on the external layer. The whole in this state are to be affixed to the picker staff A, by means of screws *f*, *f*, extending through the pack and into the staff and serving not only to compress the pack together but fasten it to the staff.

The layers treated by the composition become so indurated and tenacious that they will endure for a great length of time without injuring the action of the point of the shuttle, the outer layer in consequence of being soft and elastic will operate to prevent the shuttle from rebounding when it enters its box, and it will allow the nose of the shuttle to puncture it and bring up against the indurated part of the pack. The face piece, *e*, will also serve to steady and give a sure flight to the shuttle. Experience in the use of this improved striker has completely demonstrated its great advantage over others in use both as respects durability and cost, a great saving in the wear of the loom being effected by it.

What I claim is—

The above described composition to be used in the manufacture of the striker of a shuttle driver.

In testimony whereof I have hereunto set my signature this sixth day of December A. D. 1856.

SAMUEL BOORN.

Witnesses:
EDWARD TUCKE,
WM. LAMSON, Jr.